April 2, 1946. C. E. HEDRICK 2,397,484
POULTRY FEEDER
Filed Sept. 18, 1944
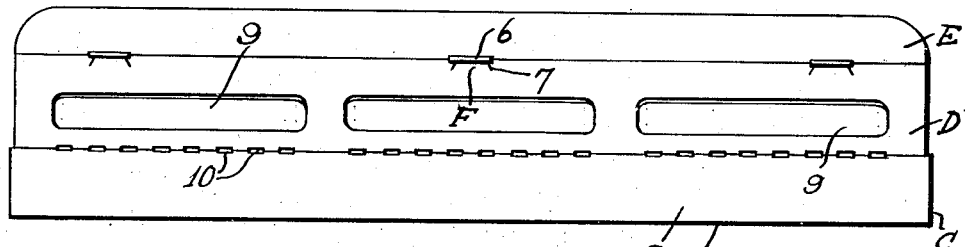
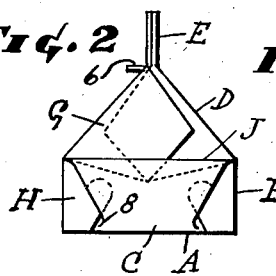
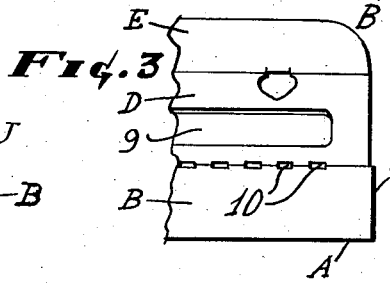
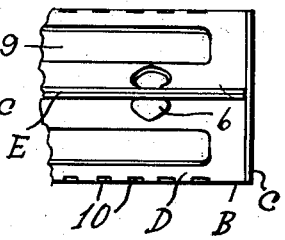
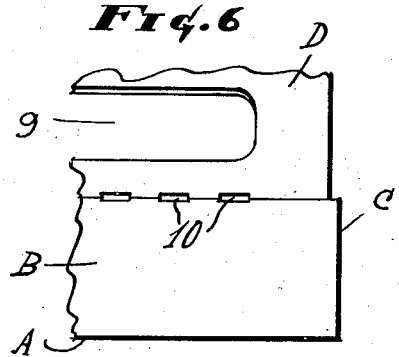
INVENTOR.
CLARENCE ELLIOTT HEDRICK
BY U. G. Charles
atty.

Patented Apr. 2, 1946

2,397,484

UNITED STATES PATENT OFFICE 2,397,484

POULTRY FEEDER

Clarence Elliott Hedrick, Newton, Kans.

Application September 18, 1944, Serial No. 554,570

1 Claim. (Cl. 119—61)

This invention relates to poultry feeders and has for its principal object a feeder provided with large openings as feeding space through which young chicks will readily observe the feed contained in the feeder and the said poultry feeder being constructed from a single sheet of material such as cardboard, or the like, as an inexpensive article of merchandise, and furthermore the cardboard being cut and scored so that the same is easily formed and secured in operative position as a feeder without further use of tools.

A further object of this invention is to provide elongated openings, horizontally disposed, through which chicks, turkey poults or the like may feed in closer contact with each other than was possible in feeders having a plurality of vertically disposed openings for the chicks individually.

A still further object of this invention is to provide elongated slits or slots through the cardboard in spaced relation endwise and being along the score near the lower side of the elongated openings to insure a uniform slant of a narrow portion of material at the lower side of said openings.

A still further object of this invention is that by providing elongated openings through which the chicks feed will facilitate as an efficient means to fill the feeder with food substance through said openings by use of a scoop or by hand whereby poultry feed is conserved against waste and the feeder readily filled.

Referring to the drawing:

Fig. 1 is a side elevation of the feeder in its assembled form.

Fig. 2 is an end view of Fig. 1.

Fig. 3 is a fragmentary view of the opposite side of Fig. 1.

Fig. 4 is a fragmentary plan view of the feeder.

Fig. 5 is a plan view of the blank from which the feeder is formed.

Fig. 6 is an enlarged fragmentary view of the feeder to illustrate more clearly the relation of the score and slots at the bending point beneath the feeding openings.

As a more concise description of the invention, attention is directed that the feeder operatively assembled is made from a sheet 1 of cardboard or the like, the sheet being cut by a die to form its contour as well as internal arrangements and being scored as at 2, 3, 4, and 5, said scores being in parallelism with their respective edges and ends of the cardboard whereby the same is accurately bent to form a feeder having a bottom A, sides B, ends C, a pitched top D, and a ridge E, the latter being two ply as assembled and vertically disposed. The ridge thus formed is means to avoid poultry from perching thereon and furthermore the length being equal to the length of the feeder and extending upward for ample width on which advertising may be printed.

It will be noted that the ridge is secured together where the members join the pitched portions by keys 6 engaging through slits 7, the slits at their opposite ends being continued obliquely outward from each other to form a lip F to be bent sidewise so that the ends of the keys will pass through the slots at the outer extremity of their convergence, and the said lips to be retracted to their normal position to bind the keys in place.

It will also be seen that the ends of the feeder are closed by the interlapping of portions G, H, and J, and locked to position, portions H functioning as keys when passed through their respective slits 8.

The arrangement for closing the ends and including the keys in their spaced relation on the ridge are involved in my former U. S. patent bearing Number 2,243,154 of May 27, 1941, and such I do not claim broadly in this application.

In this invention as an improvement I have provided elongated horizontally disposed feeding openings 9 for chicks and being so arranged will eliminate an individual opening for each chick as the same will crowd closely together whereby a greater number of chicks will feed at one time over that in openings subdivided for each chick, and another improvement attained by the horizontal elongation of the slots is the advantage of introducing the feed into the feeder as a scoop or the palm of the hand will efficiently place the feed through such openings.

To assure a uniform slant of the pitched top along the lower side of the openings and being in the score 3 is a plurality of narrow slot-like openings 10 to weaken the bending point along the score where the sides of the feeder and pitched top meet, the arrangement of which will assure a uniform slant of the card portion beneath the opening on the same plane with the slanting portion of the top, said portion being maintained with respect to its slant will function as a baffle for feed thrown by the chicks, and while a series of slots are provided at the score the same could be substituted by apertures in closely spaced relation along the score, and in either instance of narrow slots or apertures the alignment of the series may terminate equal with the ends of the feed openings to maintain added strength along the scores extending between the adjacent ends of the openings.

While I have shown and described a series of narrow slots at the bending point beneath each elongated opening in the top of the feeder, I do not wish to be restricted to such alone as a series of slits applied in the production with respect to length and their spaced relation will function in like manner to that of the slots, and such other modifications may be employed as lie within the scope of the appended claim.

Having thus described my invention what I claim as new and desire to secure by Letters Patent is:

A poultry feeder blank of sheet material having scores therein to define a body portion which when folded at the scores will have a rectangular base, a pair of sides attached to the longer edges of said base, said pair of sides adapted to extend vertically upward, then converge to form at the zone of their convergence a bridge structure, the two elements of said bridge structure being provided with tabs and slots for interlocking, a pair of sides attached to the shorter sides of said base, adapted to extend vertically upward to provide end members at the said pair of sides attached to the longer sides of said base, said pair of sides attached to the shorter side of the base having tabs and slots to interlock, certain of said scores being parallel to a long edge of the blank and others of said scores being parallel to a short edge of the blank, openings of substantially rectangular shape in portions of the blank, the longer sides of said openings being parallel to the scores that are parallel to a long edge, the ends of said openings having rounded corners, and slots closely adjacent to a longer side of an opening in one line of scores, said slots being of larger formation than the other scores of that line and being limited to a length co-extensive with the length of adjacent openings, said openings adapted to be used as feed openings.

CLARENCE ELLIOTT HEDRICK.